(12) United States Patent
Leifer et al.

(10) Patent No.: US 10,934,489 B2
(45) Date of Patent: Mar. 2, 2021

(54) FLAME-RETARDED TRANSPARENT POLYCARBONATE COMPOSITIONS

(71) Applicant: BROMINE COMPOUNDS LTD., Beer Sheva (IL)

(72) Inventors: Marc Leifer, Gedera (IL); Eyal Eden, Shoham (IL); Yaniv Hirschsohn, Rehovot (IL)

(73) Assignee: BROMINE COMPOUNDS LTD., Beer Sheva (IL)

(*) Notice: Subject to any disclaimer, the term of this patent is extended or adjusted under 35 U.S.C. 154(b) by 22 days.

(21) Appl. No.: 16/330,012

(22) PCT Filed: Sep. 5, 2017

(86) PCT No.: PCT/IL2017/050992
§ 371 (c)(1),
(2) Date: Mar. 1, 2019

(87) PCT Pub. No.: WO2018/047166
PCT Pub. Date: Mar. 15, 2018

(65) Prior Publication Data
US 2019/0185755 A1    Jun. 20, 2019

Related U.S. Application Data

(60) Provisional application No. 62/384,739, filed on Sep. 8, 2016.

(51) Int. Cl.
*C08K 5/3492* (2006.01)
*C09K 21/12* (2006.01)
*C09K 21/10* (2006.01)
*C08L 69/00* (2006.01)
*C08K 5/523* (2006.01)

(52) U.S. Cl.
CPC ............ *C09K 21/12* (2013.01); *C08K 5/3492* (2013.01); *C08K 5/34924* (2013.01); *C08K 5/523* (2013.01); *C09K 21/10* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 4,486,560 A * | 12/1984 | Thomas | C08K 5/0066 524/100 |
| 5,907,040 A | 5/1999 | Nishibori et al. | |
| 5,965,731 A | 10/1999 | Ao et al. | |
| 6,075,142 A | 6/2000 | Nishibori et al. | |
| 8,003,727 B2 * | 8/2011 | Jang | C08L 33/12 524/508 |
| 8,119,711 B2 | 2/2012 | Moy et al. | |
| 2011/0098386 A1 | 4/2011 | Krauter et al. | |

FOREIGN PATENT DOCUMENTS

| | | |
|---|---|---|
| CN | 101511850 A | 8/2009 |
| CN | 101792585 A | 8/2010 |
| EP | 0672717 A1 | 9/1995 |
| EP | 2089402 B1 | 8/2015 |

OTHER PUBLICATIONS

International Search Report and Written Opinion issued for International Application No. PCT/IL2017/050992 dated Jan. 4, 2018, 9 pages.
Notification of Office Action with English Translation of the Search Report cited in Chinese Application No. 201780054778.2 dated Sep. 4, 2020, 6 pages.

* cited by examiner

*Primary Examiner* — Tae H Yoon
(74) *Attorney, Agent, or Firm* — Rothwell, Figg, Ernst & Manbeck, P.C.

(57) ABSTRACT

A transparent composition comprising polycarbonate and a mixture of flame retardants, wherein the flame retardants are aryl phosphate ester of hydroquinone and tris(2,4,6-tribromophenoxy)-s-triazine.

6 Claims, No Drawings

FLAME-RETARDED TRANSPARENT POLYCARBONATE COMPOSITIONS

CROSS REFERENCE TO RELATED APPLICATION(S)

The present application is a 35 U.S.C. § 371 National Phase Entry Application from PCT/IL2017/050992, filed on Sep. 5, 2017, and designating the United States, which claims the benefits of priority to U.S. Application No. 62/384,739, filed on Sep. 8, 2016, which are incorporated herein by reference in their entirety for all purposes.

Polymers in commercial use contain additives, such as flame retardants. The flammability characteristics of plastic materials are quantifiable according to a method specified by Underwriter Laboratories standard UL 94, where an open flame is applied to the lowermost edge of a vertically mounted test specimen made of the tested polymer formulation. The specimens used in the UL 94 test method vary in thickness (typical thicknesses are ~3.2 mm, ~1.6 mm, ~0.8 mm and ~0.4 mm). During the test, various features of the flammability of the test specimens are recorded. Then, according to the classification requirements, the tested polymer formulation is assigned with either V-0, V-1 or V-2 rating at the measured thickness of the test specimen. Polymer formulation assigned the V-0 rating is the least flammable.

Polycarbonate is a transparent polymer possessing high impact strength which finds utility in a wide variety of applications such as laboratory safety shields, safety helmets, automotive parts, food containers and telephone and electronic parts. Polycarbonate is conventionally flame retarded by sulfonate salt additives which are generally effective in very small amounts (e.g., the potassium salt of diphenyl sulphone sulphonate, abbreviated herein KSS). KSS has been successfully used to achieve UL 94 V-0 rating in 1.6-3.2 mm thick specimens made of polycarbonate, either as the sole additive or with the aid of phenyl methyl siloxane (abbreviated herein PMS), without having adverse effect on the transparency of the polymer.

Experimental work done in connection with the present invention has shown that flame retarded, UL 94 V-0 rated, polycarbonate products with thickness smaller than 1.6 mm, e.g., 0.4 mm thick polycarbonate specimens, are difficult to produce without loss of transparency. Therefore, there exists a need for a flame retardant additive to enable 0.8-0.4 mm polycarbonate test specimens to comply with the UL-94 V-0 strict requirements while retaining the optical properties of the polymer.

It is generally known that aryl phosphate esters and their oligomers are useful as flame retardants. More specifically, it has been shown in EP 2089402 that one particular aryl phosphate ester of hydroquinone (1,4-dihydroxybenzene) of Formula (I):

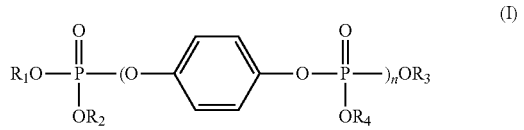

(I)

where $R_1=R_2=R_3=R_4$=phenyl, $1.0<n\leq1.1$, that is, hydroquinone bis(diphenyl phosphate) with an n average value of about $1.0<n\leq1.05$, e.g., 1.02, can be prepared in a solid form and that the product effectively reduces the flammability of the alloy of polycarbonate with acrylonitrile-butadiene-styrene (PC/ABS). It has also been reported in EP 2089402 that the aforementioned product can be added to polycarbonate resins at 5% loading to achieve UL-94 1.6 mm/V-0 classification.

As mentioned above, in the UL-94 burning test, the thinner the specimens are, the longer the burning time. Thus, higher loadings of the flame retardant are normally needed to enable a material to fulfill the requirements of the burning test with the relatively thin specimens. In attempts to reach V-0 class for polycarbonate at 0.4 mm thickness using the hydroquinone bis(diphenyl phosphate) of Formula I as a flame retardant, its concentration was increased up to a loading of 20%. The resultant 20% formulation—though possessing good optical properties and acceptable transparency—was only able only to pass the V-2 test for the 0.8 mm and 0.4 mm thickness. Improvement in UL 94 classification was not attained even with the aid of auxiliary additives known to be effective in polycarbonate, such as KSS, or KSS in combination with PMS, which were coupled to the hydroquinone bis(diphenyl phosphate).

It has now been found that a mixture consisting of: (i) aryl phosphate ester of hydroquinone (1,4-dihydroxybenzene) of Formula I:

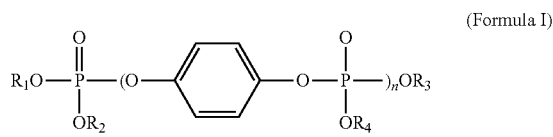

(Formula I)

wherein $R^1$, $R^2$, $R^3$ and $R^4$ each independently is aryl (e.g., phenyl) or alkyl-substituted aryl (e.g., xylenyl), optionally interrupted with heteroatoms, and n has an average value of from about 1.0 to about 2.0; and (ii) tris(2,4,6-tribromophenoxy)-s-triazine of Formula II:

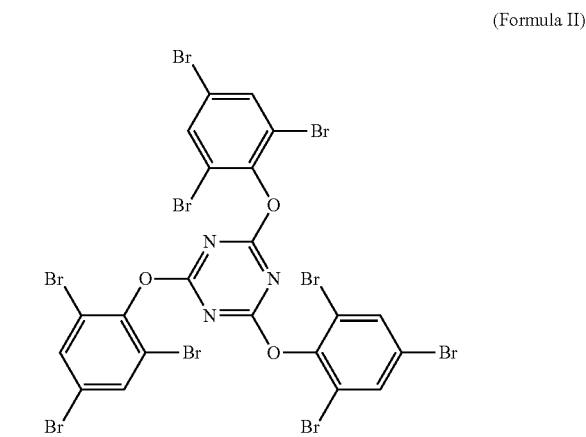 [SMILES: Brc1cc(Br)c(Oc2nc(Oc3c(Br)cc(Br)cc3Br)nc(Oc3c(Br)cc(Br)cc3Br)n2)c(Br)c1]

(Formula II)

can be added to a polycarbonate resin to produce products displaying high level of flame retardancy across the entire thickness range tested in the UL-94 vertical flammability test (including for the thinner specimens, i.e., the 0.4-0.8 mm thickness), with good optical properties, that is, acceptable transparency.

The first component of the additive mixture is an aryl phosphate ester of hydroquinone of Formula I in a solid form, which may be employed in the form of pastilles. These pastilles, when compounded with thermoplastics, avoid various handling problems as well as impart improved thermal properties, such as resin flow. In general, the hydroquinone bis-phosphates of Formula I are prepared by reacting a diaryl halophosphate with hydroquinone in the presence of a catalyst. For example, diphenylchlorophosphate (DPCP) is reacted with hydroquinone in the presence of $MgCl_2$ to produce hydroquinone bis-(diphenyl phosphate). In accordance with the present invention, hydroquinone bis (diphenyl phosphate) within general Formula (I) prepared by this process will have an average n value of about 1.1 or less. Detailed methods for synthesizing compounds of Formula I can be found in EP 2089402. The preferred compound of Formula I to be used in this invention [$R_1$=$R_2$=$R_3$=$R_4$=phenyl, $1.0 < n \leq 1.1$, that is, hydroquinone bis(diphenyl phosphate) with an n average value of about $1.0 < n \leq 1.05$] is the product of Example 1 of EP 2089402, hereinafter named "HDP" for the purpose of simplicity.

The second component of the additive mixture is tris(2,4,6-tribromophenoxy)-s-triazine. The preparation of tris(2,4,6-tribromophenoxy)-s-triazine is generally based on a reaction of cyanuric chloride with 2,4,6-tribromophenolate under various conditions well known in the art (see, for example, U.S. Pat. Nos. 5,907,040, 5,965,731 and 6,075,142). The compound is available on the market (FR-245 from ICL-IP). Tris(2,4,6-tribromophenoxy)-s-triazine was mentioned in US 2011/0098386 in connection with reducing the flammability of polycarbonate as a secondary additive joined to KSS. Hereinafter, Tris(2,4,6-tribromophenoxy)-s-triazine is named for the sake of simplicity "FR-245".

We have found that mixtures consisting of compound of Formula I and FR-245, characterized in that FR-245 is the predominant component of the mixture, for example, mixtures proportioned such that the weight ratio HDP:FR-245 preferably lies in the range from 1:2 to 1:5, can be incorporated into polycarbonate at a reasonable loading to achieve UL 94 V-0 rating in test specimens with thickness equal to or smaller than 1.6 mm, without adversely affecting the optical properties of the polymer. Polycarbonate transparent products which can benefit from the HDP:FR-245 additive mixture can be found in home appliances, lighting, automotive & transportation, electrical devices, construction, electronics, IT and communication, medical & health-care devices.

The invention is therefore primarily directed to a composition comprising polycarbonate and a mixture of flame retardants comprising (i) an aryl phosphate ester of hydroquinone of Formula I, in particular the hydroquinone bis (diphenyl phosphate) described above and (ii) tris(2,4,6-tribromophenoxy)-s-triazine, wherein the concentration of said additive mixture is preferably in the range from 10% to 20% by weight based on the total weight of the polycarbonate composition, e.g., in the range of 11% to 15%, for example, from 12% to 14 (e.g., %12.5%-13.5%), wherein the weight ratio compound of Formula I:FR-245 is in the range of 1:2 to 1:5, preferably 1:3 to 1:4, e.g., 1.0:3.1 to 1.0:3.5, in particular around 1.0:3.3. The composition preferably comprises HDP in the range of 2 phr to 7 phr and FR-245 in the range of 10 phr to 13 phr (the term phr refers to parts of additive by weight per 100 parts by weight of the resin, the resin in this case being polycarbonate).

The composition of the invention is transparent. For example, when tested according to ASTM D1746-97, light transmission of not less than 96%, e.g., not less than 97%, is recorded for the composition. The composition, when in a shape of a test specimen having thickness (D) $D \leq 1.6$ mm, e.g., $D \leq 30.8$ mm, namely D=0.8 mm or D=0.4 mm, meets the UL 94 V-0 test requirements.

The composition of the invention comprises not less than 80%, preferably from 80% to 90% by weight, polycarbonate. The invention is not limited to any particular grade of polycarbonate. In its most general form, polycarbonate is characterized by a repeating unit —O—R—O—C(O)—, where R is the divalent radical corresponding to the dihydroxy compound employed in the polymerization reaction with the carbonate precursor. The reaction (e.g., where the carbonate precursor is phosgene) is well known. Relevant details concerning the synthetic methods can be found in US 2011/0098386 and references incorporated therein. The invention is of course especially directed to polycarbonate based on bisphenol, notably bisphenol A, which has gained commercial importance. Polycarbonate based on bisphenol A is generally a linear polymer but branched grades are also available on the market. The invention pertains to all polycarbonate grades (linear and branched). Commercial polycarbonate grades which are especially suitable for use in the invention have weight average molecular weight in the range from 10000 up to 100000 and melt flow rate in the range from 2 to 50 [grams/10 minutes], such as Makrolon® produced by Covestro or LEXAN™ produced by SABIC.

For example, compositions comprising not less than 83% by weight of polycarbonate (e.g., in the range of 84% to 88%) and a mixture of HDP:FR-245 proportioned in the range from 3:9 to 3:11 (e.g., about 3:10), with the mixture concentration based on the total weight of the composition being in the range of 11% to 15% (e.g., about 12% to 14%), have been shown to possess the desired flammability and optical properties.

Apart from polycarbonate and the flame retardants, the composition of this invention may further contain conventional additives, such as UV stabilizers (e.g., benzotriazole derivative), processing aids, antioxidants (e.g., hindered phenol type), lubricants, pigments, dies and the like. The total concentration of these auxiliary additives is typically not more than 3% by weight.

The compounding of the polycarbonate compositions of the invention may be accomplished in different ways. For example, the ingredients (flame retardants in the form of powders or pastilles, polycarbonate in a powder form or pelletized polycarbonate) can be fed simultaneously into a compounding equipment, such as a co-rotating twin-screw extruder. Alternatively, some or all of the ingredients of the composition may be premixed together, that is, they can be dry blended using suitable mixing machines, such as Henschel mixer, and the resulting mixture may then be charged to the compounding device. Process parameters such as barrel temperature, melt temperature and screw speed are described in more detail in the examples that follow. In the compounding methods described below, the flame retardants of the invention were added to the extruder in a powder form or as pastilles, either separately or as a premix.

The compounded pellets thus obtained are suitable for feed to an article shaping process such as injection molding, extrusion molding, compression molding, optionally followed by another shaping method.

Articles that can be produced from the polycarbonate formulations of the invention include products found in home appliances, lighting, automotive & transportation, electrical devices, construction, electronics, IT and communication, medical & health-care devices. Such molded articles, e.g., injection molded articles and components, form another aspect of the invention, especially thin molded article having a thickness of 0.8 mm or less assigned with UL 94 V-0 rating.

EXAMPLES

Ingredients of the Compositions

The materials used for preparing the polycarbonate formulations are tabulated in Table 1 (FR is the abbreviation of flame retardant):

TABLE 1

| Component (manufacturer) | GENERAL DESCRIPTION | FUNCTION |
|---|---|---|
| PC Makrolon 3106 (Bayer) | Polycarbonate (MFI = 6.5 g/10 min) | Plastic matrix |
| HDP (Example 1 of EP 2089402; also available from ICL-IP) | hydroquinone bis(diphenyl phosphate) | FR |
| FR-245 (ICL-IP) | Tris(tribromophenoxy)triazine | Brominated FR |
| KSS-FR ® (Arichem) | Potassium salt of a complex of diphenyl sulfone sulfonate and diphenyl sulfone disulfonate | FR |
| Oil RJ-255 (Hangzhou Ruijiang Chemical Co. Ltd) | Phenyl Methyl Siloxane | FR |
| Irganox ® B 225 (BASF) | Blend of Irganox 1010 (hindered phenol type) and Irgafos ® 168 (phosphite type) | Primary and secondary antioxidants |

Flammability Test

The flammability test was carried out according to the Underwriters-Laboratories standard UL 94, applying the vertical burn on specimens of 3.2 mm, 0.8 mm or 0.4 mm thickness.

Optical Properties

The instrument used was Datacolor C600. Transparency was measured according to ASTM D1746 97 and haze according to ASTM D1003 standard test methods. Yellowness index: D1925-70.

Examples 1-4 (Comparative) and 5 (Of The Invention) Flame Retarded Transparent Polycarbonate Compositions In this set of examples, hydroquinone bis(diphenyl phosphate) of Formula I (that is, HDP) and tris(tribromophenoxy)triazine (that is, FR-245) were tested to determine their ability to reduce the flammability of polycarbonate test specimens with thickness of 3.2 mm, 0.8 mm or 0.4 mm. HDP and FR-245 were used separately in the compositions illustrated in comparative Examples 1 and 4, respectively. In the compositions of comparative Examples 2 and 3, HDP was combined with KSS and KSS/PMS mixture, respectively. In the composition of Example 5, HDP and FR-245 were used together. The compositions and their properties are described in Table 3 below.

To prepare the compositions, polycarbonate pellets (Makrolon 3106 pellets) and additives (HDP as pastilles, the others as powders) were fed into a twin-screw co-rotating extruder ZE25 with L/D=32 through its main feeding port. The operating parameters of the extruder were as follows: Barrel temperature (from feed end to discharge end): 160° C., 180° C., 220° C., 250° C., 250° C., 260° C., 270° C., die—275° C.
Screw rotation speed: 350 rpm
Feeding rate: 12 kg/hour.

The strands produced were pelletized in a pelletizer 750/3 from Accrapak Systems Ltd. The resultant pellets were dried in a circulating air oven (Heraeus Instruments) at 120° C. for 3 hours. The dried pellets were injection molded into test specimens using Allrounder 500-150 from Arburg under the conditions tabulated below:

TABLE 2

| PARAMETER | Set values |
|---|---|
| $T_1$ (Feeding zone) | 270° C. |
| $T_2$ | 280° C. |
| $T_3$ | 290° C. |
| $T_4$ | 295° C. |
| $T_5$ (nozzle) | 300° C. |
| Mold temperature | 90° C. |
| Injection pressure | 1500 bar |
| Holding pressure | 1000 bar |
| Back pressure | 80 bar |
| Holding time | 10 s |
| Cooling time | 15 s |
| Mold closing force | 500 kN |
| Filling volume (portion) | 35 ccm |
| Injection speed | 25 ccm/sec |

Specimens of various thicknesses were prepared. The test specimens were conditioned for one week at 23° C., and were then subjected to the several tests to determine their properties. The compositions and the results are set out in Table 3.

TABLE 3

| Example | Example 1 (comparative) | Example 2 (comparative) | Example 3 (comparative) | Example 4 (comparative) | Example 5 |
|---|---|---|---|---|---|
| Composition, w % | | | | | |
| polycarbonate | 79.8 | 89.3 | 85.3 | 89.4 | 86.8 |
| HDP | 20.0 | 10.0 | 10.0 | | 3.0 |
| KSS | | 0.5 | 0.5 | | |
| PMS | | | 4.0 | | |
| FR-245 | | | | 10.4 | 10.0 |
| Irganox B-225 | 0.2 | 0.2 | 0.2 | 0.2 | 0.2 |
| Properties Flammability | | | | | |
| UL 94V 3.2 mm | V-0 | V-1 | V-2 | ND | V-0 |
| UL 94V 0.8 mm | V-2 | V-2 | V-2 | V-2 | V-0 |
| UL 94V 0.4 mm | V-2 | V-2 | V-2 | ND | V-0 |
| Optical properties | | | | | |
| Transparency | ✓ | ✓ | x | ✓ | ✓ |
| Transmission % | 96.9 | 98.5 | | 99.0 | 97.1 |
| Haze % | 3.8 | 1.6 | ND | 0.9 | 3.5 |
| Yellowness Index | 10.4 | 5.67 | ND | ND | 8.65 |

The results set out in Table 3 indicate the high efficacy of a combination consisting of HDP and FR-245 in reducing the flammability of low-thickness polycarbonate test specimens, achieving UL 94 V-0 rating while preserving the transparency of the polymer. When applied each as a sole additive, neither HDP at a loading as high as 20% by weight, nor FR-245 at a loading of 10.4% by weight, imparted V-0 rating to the polycarbonate composition.

The invention claimed is:

1. A transparent composition comprising polycarbonate and a mixture of flame retardants, wherein the flame retardants are: (i) aryl phosphate ester of hydroquinone of Formula I:

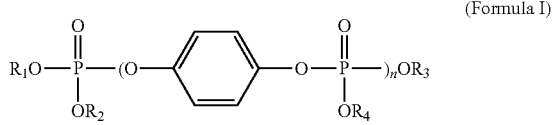

(Formula I)

wherein each of $R^1$, $R^2$, $R^3$ and $R^4$ is phenyl and $1.0 < n \leq 1.1$; and (ii) tris (2, 4, 6-tribromophenoxy)-s-triazine of Formula II:

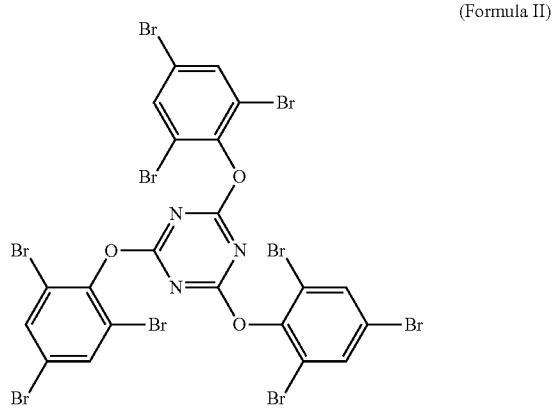 [SMILES: Brc1cc(Br)c(Oc2nc(Oc3c(Br)cc(Br)cc3Br)nc(Oc3c(Br)cc(Br)cc3Br)n2)c(Br)c1]

(Formula II)

wherein the concentration of the mixture of flame retardants is the range of 10% to 20% by weight based on the total weight of the composition, and the weight ratio (i):(ii) is in the range of 1:2 to 1:5.

2. The composition according to claim 1, wherein the concentration of the mixture of flame retardants is in the range from 11% to 15% based on the total weight of the composition.

3. The composition according to claim 2, wherein the weight ratio (i):(ii) is in the range of 1:3 to 1:4.

4. The composition according to claim 1, which when tested according to ASTM D1746-97, light transmission of not less than 96%, is recorded; and, when in a form of a test specimen having thickness (D) D≤0.8 mm, it meets the UL 94 V-0 test requirements.

5. A molded article comprising the composition of claim 1.

6. A transparent composition comprising polycarbonate and a mixture of flame retardants, wherein the flame retardants are:

(i) aryl phosphate ester of hydroquinone of Formula I:

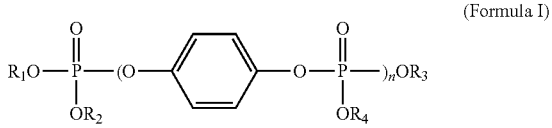

(Formula I)

wherein $R^1$, $R^2$, $R^3$ and $R^4$ each independently is aryl or alkyl-substituted aryl, optionally interrupted with heteroatoms, and n has an average value of from about 1.0 to about 2.0; and (ii) tris(2,4,6-tribromophenoxy)-s-triazine of Formula II:

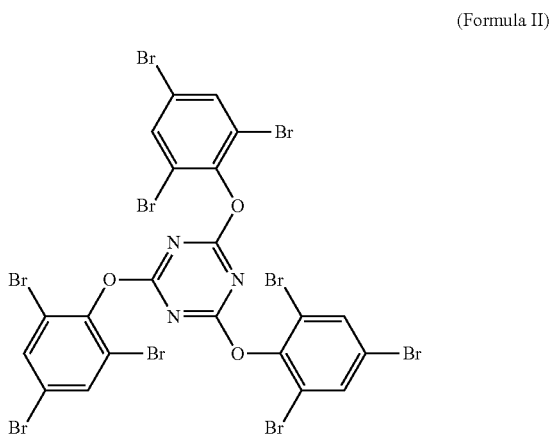 [SMILES: Brc1cc(Br)c(Oc2nc(Oc3c(Br)cc(Br)cc3Br)nc(Oc3c(Br)cc(Br)cc3Br)n2)c(Br)c1]

(Formula II)

wherein said composition, when tested according to ASTM D1746-97, light transmission of not less than 96%, is recorded; and, when in a form of a test specimen having thickness (D) D≤0.8 mm, it meets the UL 94 V-0 test requirements.

* * * * *